C. L. FINCH.
FLANGE CUTTING MACHINE.
APPLICATION FILED NOV. 14, 1907.

912,238.

Patented Feb. 9, 1909.
3 SHEETS—SHEET 1.

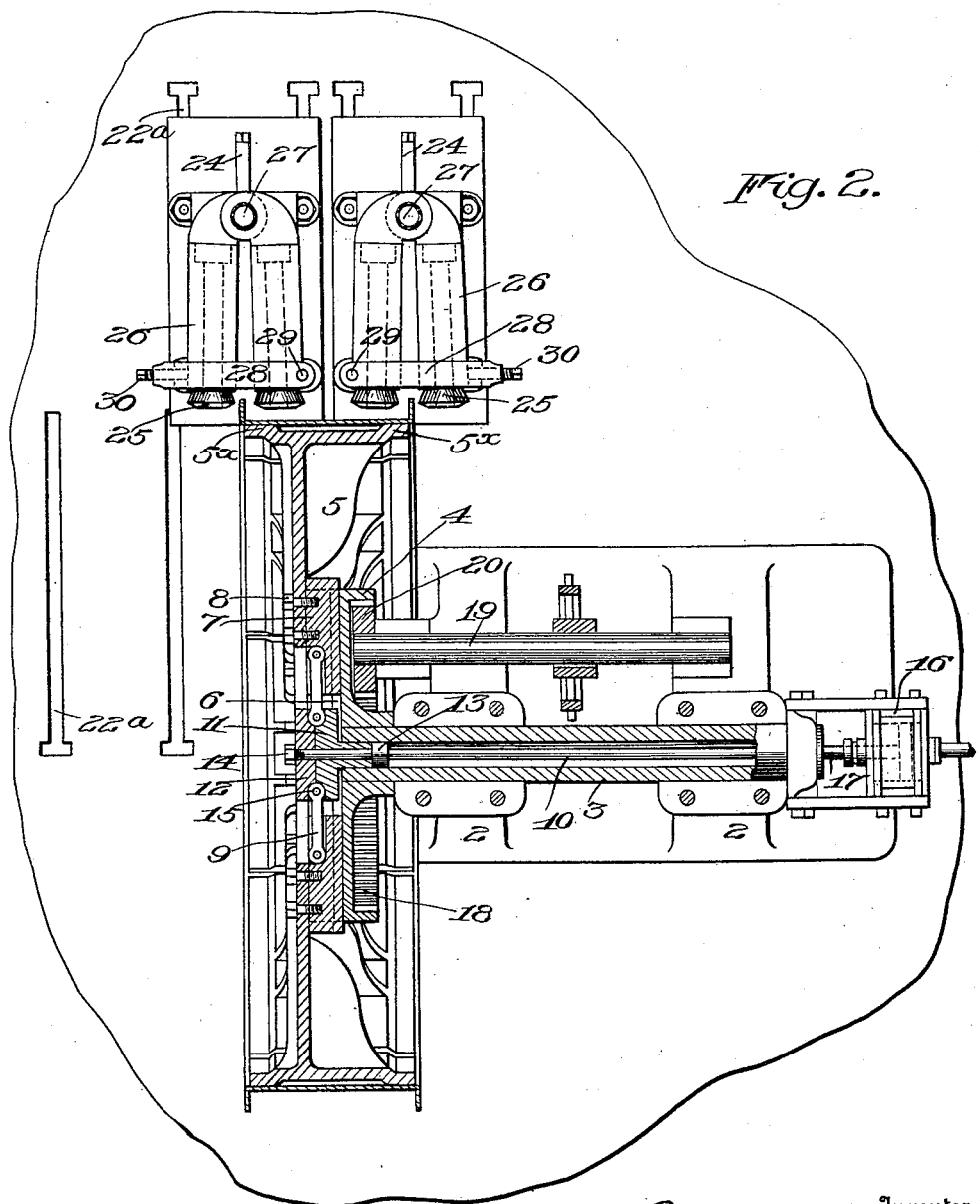

C. L. FINCH.
FLANGE CUTTING MACHINE.
APPLICATION FILED NOV. 14, 1907.

912,238.

Patented Feb. 9, 1909.
3 SHEETS—SHEET 3.

Witnesses
Walter B. Payne.
H. H. Simms

Inventor
Clarence L. Finch
By Church & Rich
his Attorneys

UNITED STATES PATENT OFFICE.

CLARENCE L. FINCH, OF ROCHESTER, NEW YORK, ASSIGNOR TO THE PFAUDLER COMPANY, OF ROCHESTER, NEW YORK, A CORPORATION OF NEW YORK.

FLANGE-CUTTING MACHINE.

No. 912,238.      Specification of Letters Patent.      Patented Feb. 9, 1909.

Original application filed September 13, 1907, Serial No. 392,627. Divided and this application filed November 14, 1907.

Serial No. 402,090.

*To all whom it may concern:*

Be it known that I, CLARENCE L. FINCH, of Rochester, in the county of Monroe and State of New York, have invented certain new and useful Improvements in Flange-Cutting Machines; and I do hereby declare the following to be a full, clear, and exact description of the same, reference being had to the accompanying drawings, forming a part of this specification, and to the reference-numerals marked thereon.

The present invention which has been divided from an application filed by me on September 13th, 1907, Serial No. 392,627, on a flanging machine, relates to a machine for cutting or trimming flanges on cylindrical bodies, and it has for an object to provide a construction which will render unnecessary the hand trimming of flanges formed on large vats or tanks built up of sections.

To these and other ends the invention consists in certain improvements and combinations of parts all as will be hereinafter more fully described, the novel features being pointed out in the claims at the end of the specification.

Figure 1:
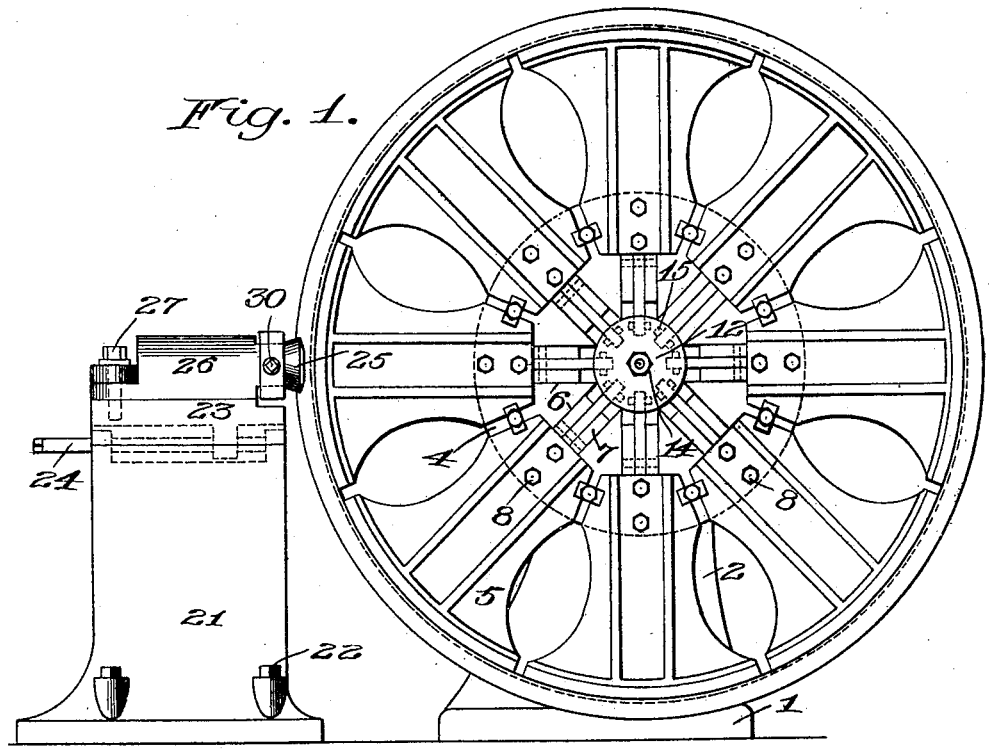
Figure 4:
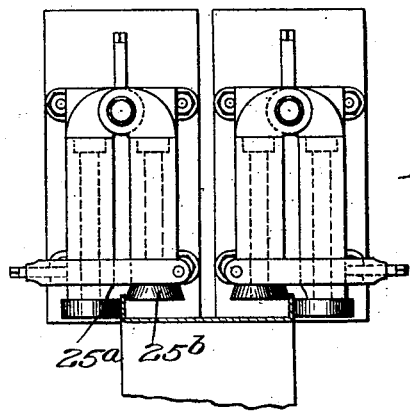
Figure 3:
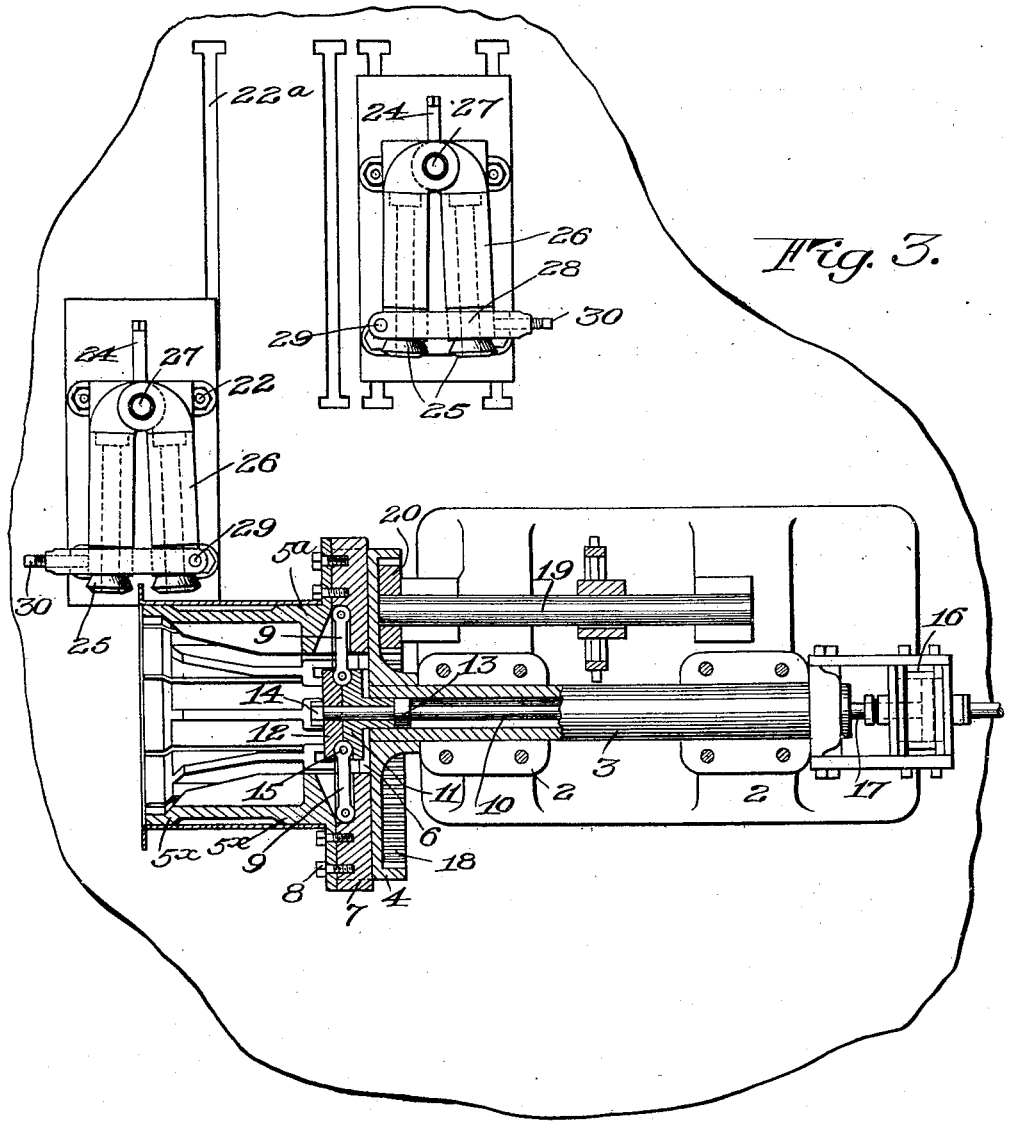

In the drawings: Figure 1 represents a front elevation of a machine constructed in accordance with this invention; Fig. 2 represents a horizontal section of the chuck or holder, the cutting device being shown in plan; Fig. 3 represents a horizontal section of the machine adjusted to cut smaller bands or sections; and Fig. 4 represents a detail plan view of another cutting device constructed in accordance with this invention.

In the manufacture of large vats or tanks formed of sections, it is customary first to provide a ring shaped section with flanges at its opposite ends and then to unite these flanges to flanges on other sections. As it is impossible to form flanges having the same width, the flanges have to be trimmed and this has been done by a hand tool, after the sections have been riveted together, which not only consumes a great deal of time to complete the operation, but produces an uneven edge and requires the handling of the entire vat. With this invention the trimming of flanges on cylindrical bodies cannot only be done in a much shorter time, both flanges on each section being cut simultaneously and unnecessary handling being dispensed with, but the edges formed are smoother and the width of the flanges is more regular.

In the embodiment of the invention herein shown there is employed a bed plate 1 on which preferably are arranged supports 2 on the upper portions of which is journaled a shaft or spindle 3 which carries the chuck or rotary expansible holder. The chuck is formed preferably by arranging at one end of the shaft 3 a head 4, the outer face of which has a plurality of jaws movable thereon, being for this purpose formed with radial guides 6 on which move slides 7, to which the jaws 5 are secured by bolts 8, permitting their removal and the attachment of other jaws $5^a$ of different length as shown in Fig. 3. All of the jaws have their outer faces curved near both edges at $5^\times$ so that when the chuck is expanded they will lie flush against the inner surface of the band, ring, section or the like.

The expansion or movement of the jaws is effected by any suitable means, but it is preferred to connect them by links 9 to a plunger 10, the links being united to the plunger by two disks 11 and 12 arranged between a flange 13 and a nut 14 on the plunger and receiving pivots 15 integral with the links. The plunger is mounted in the shaft 3 which for this purpose is made hollow, while to the outer end of the shaft is secured a fluid pressure cylinder 16 which rotates with the shaft and has its piston 17 connected to the plunger 10.

In order to rotate the chuck or holder, it is preferred to employ an internal gear 18 integral with the inner face of the head 4 and having a drive shaft 19 geared thereto by a pinion 20, said shaft 19 being also journaled on the supports 2.

The cutting devices preferably two in number, one for each flange, may be mounted on the bed plate, to one side of and at each end of the rotary expansible holder, so as to operate in a plane parallel to the axis of the holder, and for this purpose there may be provided for each a support 21 roughly adjustable for different sizes of bands, to and from the chuck, or in a direction transverse to the axis of the rotary holder, on the bed plate by bolts 22 working in slots $22^a$ in the said bed plate, or other means; and having a carrier 23 adjustable on the support to and from the chuck after each cutting operation, the adjustment being preferably effected by a screw shaft 24 which is journaled on the support and engages a nut on the carrier. The cutting device may comprise two roller cutters 25 movable toward and from each other in the direction of the axis of the holder and preferably mounted on the free ends of two arms 26 pivoted on the carrier to turn about a single axis 27. The rollers may be forced together slowly by a suitable device, as for instance, a yoke 28 pivoted at 29 to one of the arms, and carrying a bolt or set screw 30 which engages the other arm.

Instead of roller cutters operating in the same plane as in Figs. 1 to 3, I may employ two cutters $25^a$ and $25^b$ operating in proximate planes as shown in Fig. 4, the cutter $25^a$ being cylindrical in form and the cutter $25^b$ being frusto-conical. The cylindrical cutter lies against the outer face of the flange to support the latter during the cutting which is effected by the edges of the two rollers.

In Fig. 3 the machine is shown supplied with jaws $5^a$ which do not extend beyond the head 4, and with this arrangement only one flange is trimmed by each cutting operation.

In operation the expansible holder having a flanged band or ring thereon is rotated, the cutting devices being first adjusted so that they engage opposite sides of the flanges. After every revolution of the holder, the cutters are advanced slightly until the metal is completely cut.

An apparatus constructed in accordance with this invention does away with the hand trimming of the joints between the sections of large vats or tanks and permits the work to be done quicker, with greater accuracy and neatness and with less trouble in handling the tank.

I claim as my invention:

1. In a flange cutting machine, the combination with a rotary holder having radially movable jaws and mechanism for rotating it, of a pair of roller cutters operating or cutting in a plane parallel to the axis of the holder and a device for moving the cutters toward each other in the same plane.

2. In a flange cutting machine, the combination with a rotary holder having radially movable jaws and mechanism for rotating it, of a cutting device mounted to cut or operate in a plane parallel to the axis of the holder, means for effecting the adjustment of the cutting device in the same plane to effect the cutting, and a device for adjusting the cutting device in a direction transverse to the axis of the holder to accommodate the cutting device to bands of different diameters.

3. In a flange cutting machine, the combination with a rotary expansible holder, of a bed plate, a support on the bed plate, adjustable toward and from the holder, a carrier on the support adjustable toward and from the holder, and a pair of cutters movable toward and from each other on the carrier to trim a band on the rotary expansible holder.

4. In a flange cutting machine, the combination with a rotary holder embodying radially movable jaws and means for moving them, of a cutting device embodying two cutters movable toward and from each other in the direction of the axis of the holder.

5. In a flange cutting machine, the combination with a rotary expansible holder, of a pair of suitably supported pivoted levers, roller cutters carried by the levers and a device for moving the levers toward each other to cause them to cut a flange on a device on the holder.

6. In a flange cutting machine, the combination with a rotary expansible holder, of a pair of suitably supported pivoted levers, roller cutters carried by the levers, a yoke pivoted at its free ends to one of the levers, and a set screw carried by the yoke to move the rollers toward each other in order to cut a flange on a device carried by the rotary holder.

7. In a flange cutting machine, the combination with a rotary expansible holder, of a support located to one side of the holder, a carrier adjustable on the support toward and from the holder, a pair of pivoted levers mounted on the carrier, roller cutters on the levers, and a device for moving the cutters toward each other.

CLARENCE L. FINCH.

Witnesses:
RUSSELL B. GRIFFITH,
H. H. SIMMS.